United States Patent [19]

Farrar et al.

[11] Patent Number: 5,005,125
[45] Date of Patent: Apr. 2, 1991

[54] SURVEILLANCE, PRICING AND INVENTORY SYSTEM

[75] Inventors: James G. Farrar, Boca Raton; Ezra D. Eskandry, Miami, both of Fla.

[73] Assignee: Sensormatic Electronics Corporation, Deerfield Beach, Fla.

[21] Appl. No.: 834,766

[22] Filed: Feb. 28, 1986

[51] Int. Cl.⁵ .............................................. G08B 13/18
[52] U.S. Cl. ...................................... 364/403; 364/900
[58] Field of Search .......................... 364/403, 900; 340/825.54, 825.34, 825.35, 572; 235/379, 380

[56] References Cited

U.S. PATENT DOCUMENTS

| | | | |
|---|---|---|---|
| 3,688,087 | 8/1972 | Howard et al. | 364/403 |
| 3,713,102 | 1/1973 | Martin | 340/825.54 |
| 4,196,424 | 4/1982 | Williamson | 340/572 |
| 4,525,713 | 6/1985 | Barletta et al. | 340/825.35 |
| 4,558,318 | 12/1985 | Katz et al. | 340/825.35 |
| 4,636,950 | 1/1987 | Caswell et al. | 340/825.54 |
| 4,656,463 | 4/1987 | Anders et al. | 340/572 |
| 4,663,622 | 5/1987 | Goldman | 340/825.34 |
| 4,673,932 | 6/1987 | Ekchian et al. | 340/825.54 |
| 4,686,513 | 8/1987 | Farrar et al. | 340/572 |
| 4,688,026 | 8/1987 | Scribner et al. | 340/572 |

FOREIGN PATENT DOCUMENTS 3340469  5/1985  Fed. Rep. of Germany ...... 364/403

*Primary Examiner*—Jerry Smith
*Assistant Examiner*—Kimthanh Tbui
*Attorney, Agent, or Firm*—Robin, Blecker, Daley & Driscoll

[57] ABSTRACT

An EAS (electronic article surveillance) system and tag of type responsive to incident energy comprising EAS messages and other messages related to pricing and identification of articles includes circuitry for response to such EAS messages and for the receipt, storage and issuance of such pricing and article identification data, message generator apparatus for transmitting such EAS and other messages in the form of tag incident energy, and apparatus for interrogating the tags to cause such tag issuance of such stored pricing and identification data. An inventory store is responsive to issuance of tag stored identification data to decrement the inventory store and the use of article price totalizer apparatus responsive to the tag issuance of such stored pricing data. Further, the tag includes display apparatus for visual presentation of such pricing data.

9 Claims, 15 Drawing Sheets

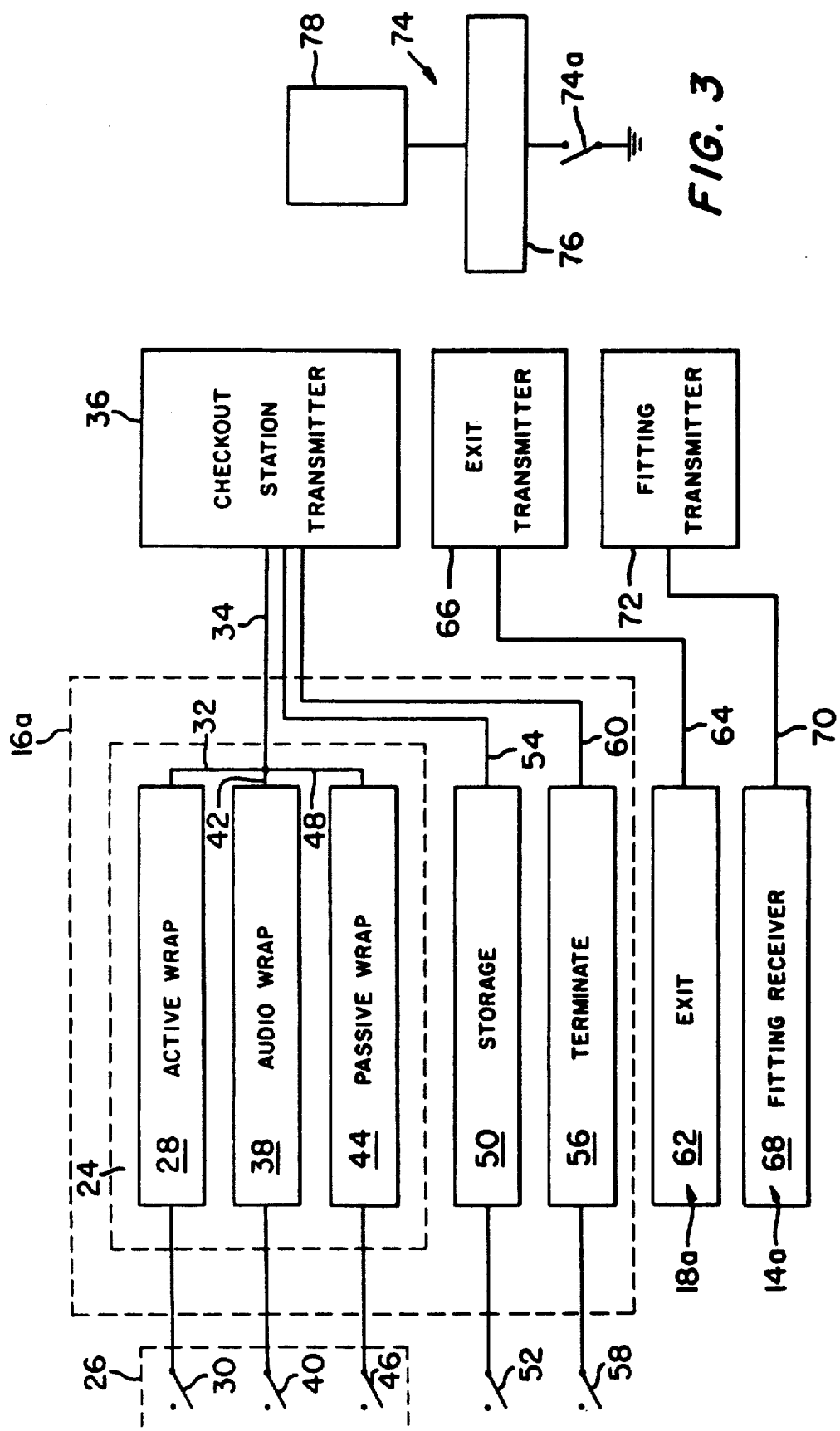

SURVEILLANCE, PRICING AND INVENTORY SYSTEM

FIELD OF THE INVENTION

This invention relates generally to inventory and pricing control in article retail facilities and pertains more particularly to electronic article surveillance (EAS) systems and related inventory and price control systems and methods.

BACKGROUND OF THE INVENTION

Retail establishments typically enjoy the separate benefits of various support systems. Thus, in the area of inventory and pricing, it is customary for a supermarket or like facility retailing articles to have the advantage of the cooperation of universal product code (UPC) reading, as by laser scanners, and an inventory and price storage unit. In such instances, article checkout has a degree of automation, whereby pricing totalizing data and inventory decrementing information entered into the support systems upon operator scanning of product code markings. There results an automated price totalization and inventory updating.

Another support system looks to control of pilferage. This system may take on any one of several forms, generally referred to as electronic article surveillance (EAS) systems, and involving the tagging of articles for purchase. Low frequency (magnetic) or high frequency (microwave and/or ratio frequency) energy is typically radiated into a control or surveillance zone, e.g., a checkout or exit area, and the tag is responsive, under theft conditions, to incident radiated energy to indicate an alarm condition.

Presently known support systems of the price and inventory control type have limitation in being dependent upon the so-called "bar code" indicium applied to articles, which is a fixed digital representation of product code identification. Upon laser scanner reading of same, such support systems resort fully to computer stores of pricing information, thus failing to provide consumer-readable pricing information on the article itself.

Likewise, presently known support systems of the EAS variety have limitation in not having coordinate action with other support systems.

In applicant's view, the present separation of coordination of the available retail facility support systems does not effect desired efficiency in retail facilities and optimum usage of the support systems thereof.

SUMMARY OF THE INVENTION

The present invention has as its primary object the provision of improved support systems for article retail facilities.

A more particular object of the invention is to provide interactive support systems for article retail facilities.

In the attainment of the above and other objects, the invention provides, for use in an article retail facility, in combination, an EAS tag of type responsive to incident energy comprising EAS messages and other messages related to pricing and identification of articles and including circuitry for response to such EAS messages and for the receipt, storage and issuance of such pricing and article identification data, message generator apparatus for transmitting such EAS and other messages in the form of tag incident energy, and apparatus for interrogating the tags to cause such tag issuance of such stored pricing and identification data.

The invention further contemplates the use of an inventory store responsive to issuance of tag stored identification data to decrement the inventory store and the use of article price totalizer apparatus responsive to the tag issuance of such stored pricing data. Further, the tag includes display apparatus for visual presentation of such pricing data.

In preferred form, the tag includes circuitry in part commonly processing the EAS and other messages, inclusive of a message decoder for providing output indication of the nature of the received message. Where the message received is of exclusive EAS nature, the invention contemplates corresponding EAS tag response and activity, such as output alarm indication. Where the received message is of other than EAS nature, the invention contemplates such pricing and/or inventory tag response and activity. Desirably, the tag response may be joint in these support respects, i.e., upon receipt of selective EAS nature messages, the tag response is both in EAS nature and price and/or identification in character.

In particularly preferred form, the invention looks to a tag of type including article attachment means and adapted for the receipt of an EAS message for checkout of an article (hereinafter a WRAP EAS message) to permit the opening of the article attachment means without alarm output indication. Circuitry is provided for sensing the coincidence of the WRAP message receipt by the tag and the opening of the tag attachment means to initiate the pricing and identification tag signal issuance, giving rise to both such price totalization and such inventory decrementing.

The foregoing and other objects and features of the invention will be further understood from the following detailed discussion of preferred embodiments and practices thereof and from the drawings wherein like reference numerals identify like parts and components throughout.

DESCRIPTION OF THE DRAWINGS

FIGS. 2 and 3 block diagrams of various transmit which may be involved in the installation of FIG. 1.

DETAILED DESCRIPTION OF PREFERRED EMBODIMENTS AND PRACTICES

Figure 16:
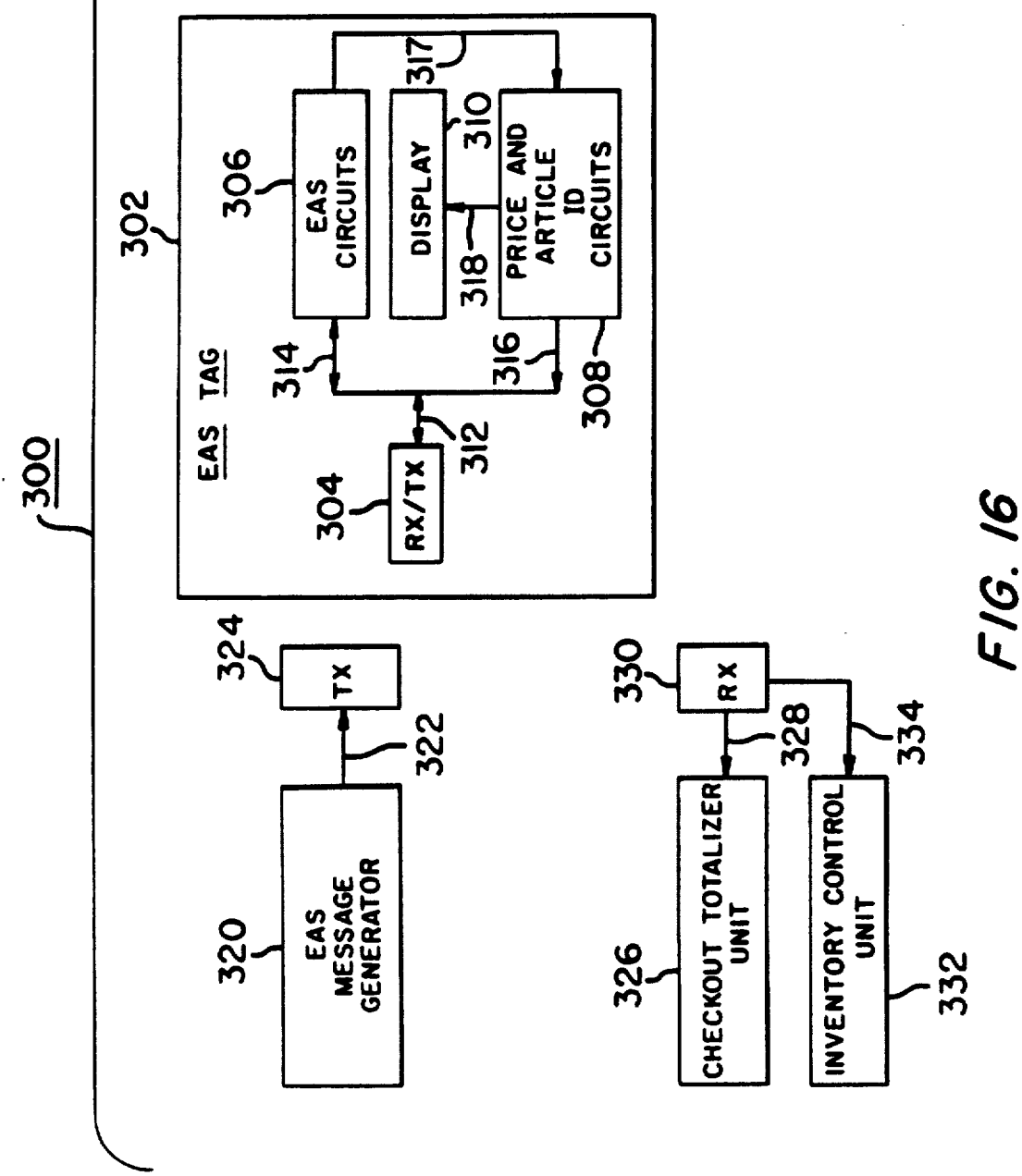
FIG. 16 is a block diagram of an EAS pricing and inventory control system in accordance with the invention.

Referring initially to FIG. 16, composite support system 300 of the invention includes an EAS tag system 302 having a receiver/transmitter (RX/TX) unit 304, EAS circuits 306, price and article identification (ID) circuits 308 and a display unit 310, interconnected by lines 312, 314, 316, 317 and 318, as indicated.

EAS tags 302 are provided in form selectively, releasably attachable to articles for which surveillance is desired, and may include attachment devices, such as safety pin type structures known in the art, the opening of which gives rise to discernible electrical circuit change.

Other components of the FIG. 16 systems include: EAS message generator 320, connected by line 322 to transmitter 324; checkout totalizer unit 326, connected by line 334 to receiver 330; and inventory control unit 332, connected by line 334 to receiver 330.

In overall scheme, a plurality of EAS tags 302 are in cooperative support with the remainder of system 300, receiving incident energy transmissions of transmitter 324 and providing output transmissions to receiver 330. Tag system 302 will further include an EAS message receiving and processing system, discussed below in connection with FIGS. 1-15.

Figure 17:
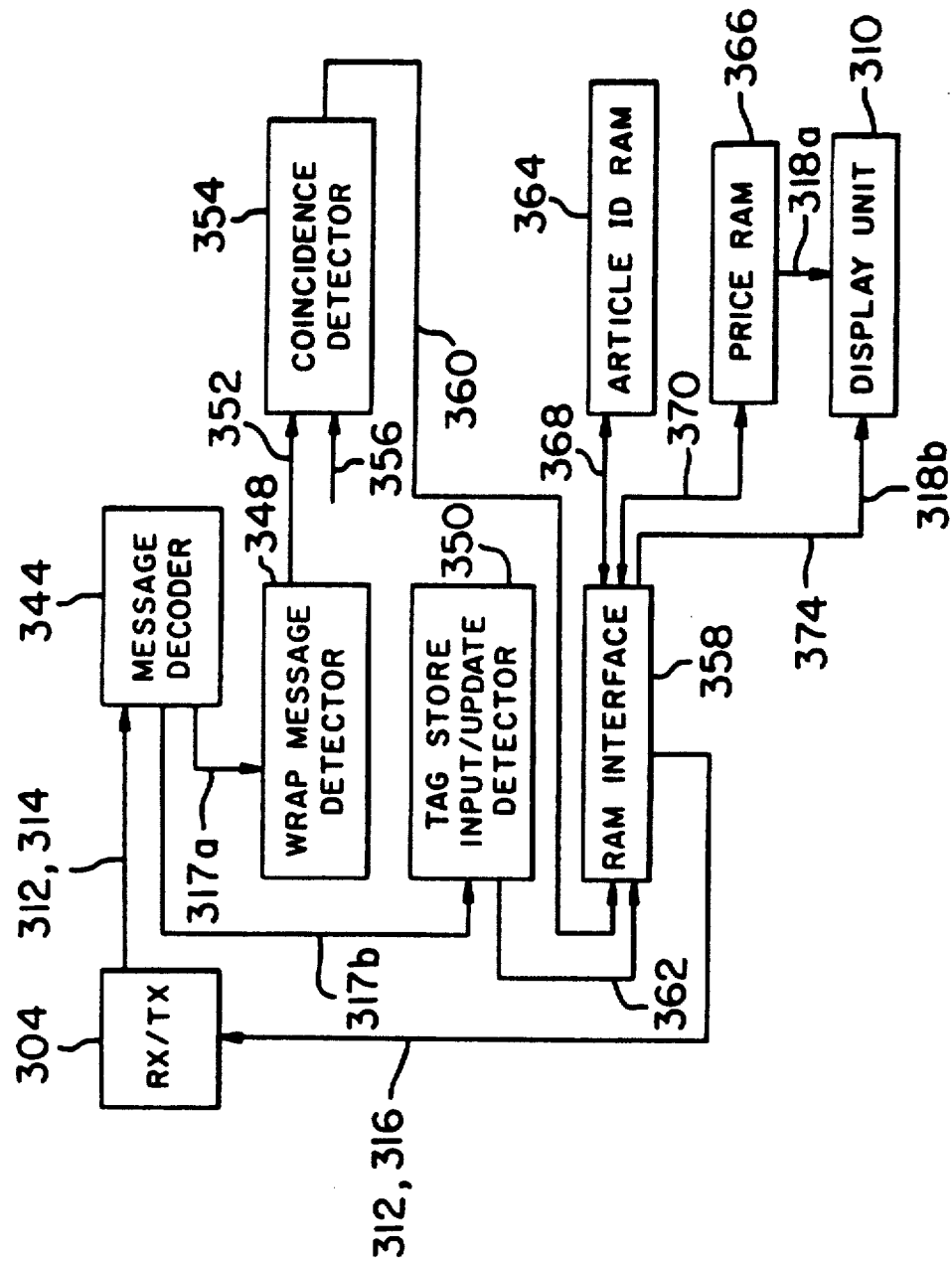
FIG. 17 is a block diagram of a preferred embodiment of a tag receiver system in accordance with the invention.

A preferred system rendition of EAS tag 302 is shown in FIG. 17. RX/TX unit 304 furnishes its output (received) signals over lines 312 and 314 to message decoder 344 which provides output to the remainder of EAS circuits 306 of FIG. 16 and over line 317a to WRAP message detector 348, and over line 317b to tag store input/update detector 350, which are components of price and article ID circuits 308 of FIG. 16.

WRAP message detector 348 provides one input on line 352 to coincidence detector 354, another input to which is provided on line 356, this being a signal indicative of the state of the EAS tag attachment device.

RAM (random access memory) interface 358 of the tag system is served on line 360 with the output of coincidence detector 354, and on line 362 with the output of tag store input/update detector 350.

Each tag system includes an article identification (ID) RAM 364 and a price RAM 366. RAM 364 communicates with interface 358 over lines 368 and RAM 366 communicates with interface 358 over lines 370. Interface 358 is connected to RX/TX unit 304 over lines 312 and 316. Display unit 310 is operative to display the price stored in price RAM 366 upon input over line 318a from price RAM 366 and concurrent input over line 318b from interface 358.

In the FIG. 16 system and particularly the FIG. 17 tag system, in such preferred indicated form, one operational mode is that of tag system article price readout.

Generator 320 applies a signal having a preamble for this mode, followed by article identification and price, to line 322 and transmitter 324 applies the signal to one or more EAS tags to be assigned to such article.

The received signal is applied by tag RX/TX 304 to message detector 344, which applies all received messages to over line 317a to wrap message detector 348.

Figure 10:
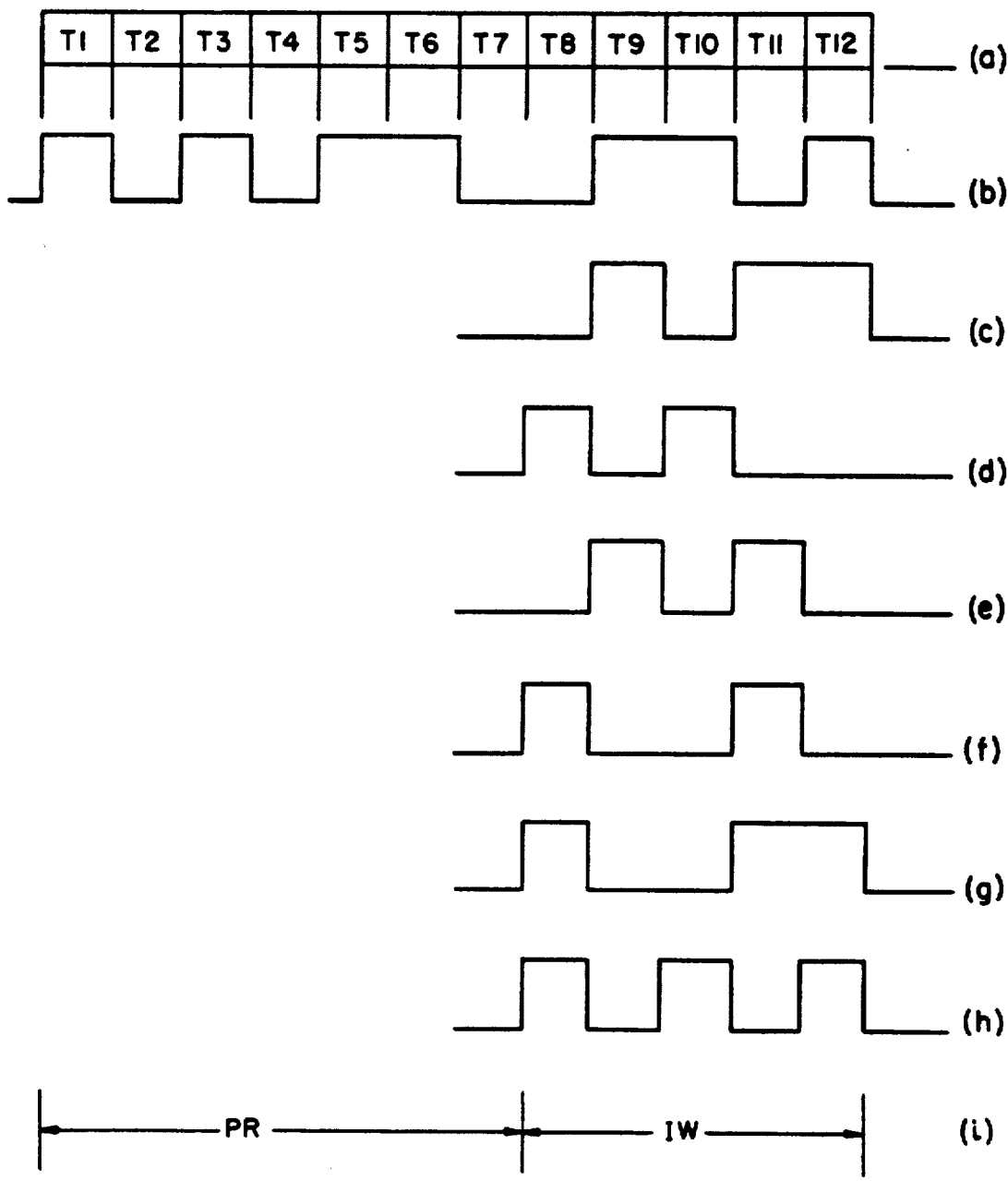
FIG. 10 shows in its subparts the several signal formats involved in the transmissions of the system of the FIG. 1 installation.

As is shown below in FIG. 10, the EAS messages have preambles, followed by a five-bit pattern indicating the nature of the message, such pattern identifying several WRAP (checkout) messages. Indication of such message receipt is provided on line 352. In the course of article checkout, the clerk will open the tag attachment pin to remove the tag from the article. At this point, coincidence detector 354 will generate output on line 360 to which RAM interface 358 is responsive to retrieve the article identification code signal from RAM 364 and article price signal from RAM 366 and applies same over lines 312 and 316 to be transmitted from RX/TX 304 to receiver 330, which is structured to discern preambles assigned thereto and detect the price and article identification in the received signals, whence this data is furnished t units 326 and 332 of FIG. 16.

In another operational mode, the tag system of FIG. 17 functions to enter information in tag RAMs 364 and 366. In this mode, generator 320 of FIG. 16 is operative, transmitting from unit 324 a preamble assigned to storing and updating the price of a given article or group of articles along with article identification and pricing data. Tag receiving such transmission have same furnished over line 317b from message decoder 344 to tag store input/update detector 350. Detector 350 so advises RAM interface 358, which then furnishes the received article identification and pricing data to RAMs 364 and 366 for storage and subsequent issuance in the tag system article price readout mode previously discussed.

Display 310, which may be a liquid crystal display (LCD), receives stored price data over line 318a from RAM 366 and displays same responsively to a signal on line 318b from RAM interface 358, which would be furnished constantly, except during updating or prior to price data initial storing.

An EAS system and tag system thereof, which would be supportive of adaptation to realize the composite systems of FIGS. 16 and 17 will now be discussed. Such adaptation will be seen simply to expand message reception and detection, and transmission to accomodate the foregoing price and article identification messages.

Figure 1:
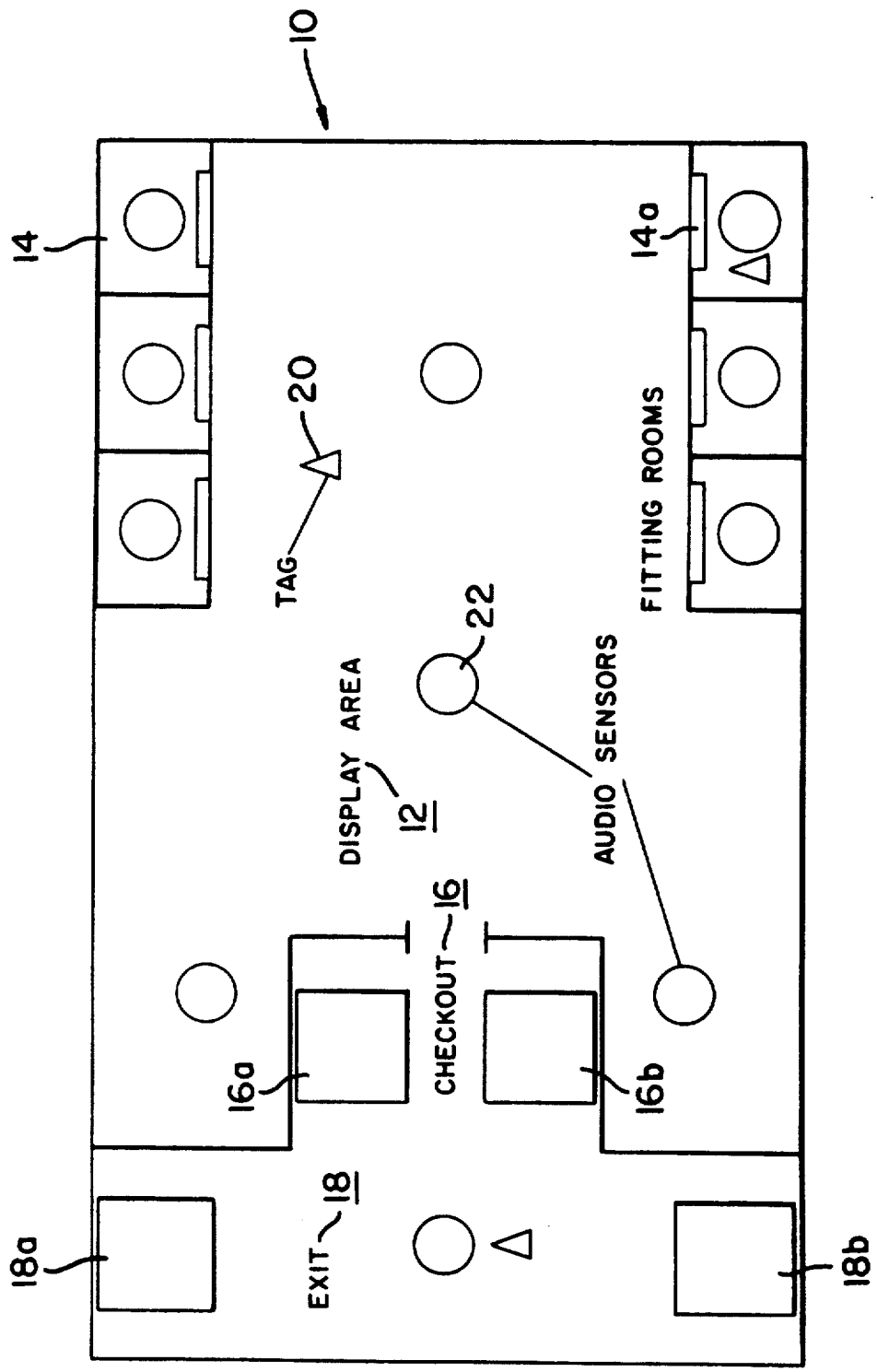
FIG. 1 is a illustration of a typical installation of a surveillance system in accordance with the invention.

Referring to FIG. 1, installation 10 is a retail establishment including a display area 12 having fitting rooms 14 to its sides with fitting units 14a, a checkout station 16 having cashier and wrapping desks and associated transmitter units 16a and 16b and an exit area 18 having transmitter and receiver units 18a and 18b. Tags are indicated by triangles at 20 and audio sensing devices are noted at various locations by the circles 22. Where tags 20 have transmit capability, as is preferred, the various transmitters will be configured as transceivers, having both transmit and receive function.

Checkout station transmitter unit 16a is shown particularly in FIG. 2 as including wrap message generator 24 and wrap message selector 26. The system of the invention contemplates three different checkout modes, Active Wrap, Audio Wrap and Passive Wrap, which will be understood from discussion below in connection with the checkout flow chart of FIGS. 7(a)–(c). Where Active Wrap is selected, generator 28 is operable by closure of switch 30 of selector 26. The output of generator 28 is conveyed over lines 34 and 36 to checkout station transmitter 36.

Where Audio Wrap is selected, generator 38 is operable by closure of switch 40 of selector 26 and output is furnished over lines 42 and 34 to transmitter 36. Likewise, where Passive Wrap is selected, generator 44 is operable by closure of switch 46 of selector 26 and output to transmitter 36 is over lines 48 and 34.

The checkout station further includes Storage generator 50 operable upon closure of switch 52 to apply a signal over line 54 to transmitter 36, such signal containing the Storage message for placing a tag in storage. Terminate generator 56 is operable by closure of switch 58 to apply a signal containing the Terminate message over line 60 to transmitter 36, such signal being effective to silence an alarming tag.

Exit generator 62 of exit transmitter unit 18a is operable at all times for conveying a signal containing the Exit interrogate message over line 64 to exit transmitter 66. Fitting receiver 68 of fitting unit 14a is operable upon receiving a tag transmission to energize fitting unit transmitter 72 over line 70, whereby a central or control station may be apprised of an alarm condition in such sequested area.

In FIG. 3 is shown portable unit 74. Closure of its switch 74a gives rise to generator 76 applying to portable transmitter 78 a signal containing the Terminate message.

Figure 4:
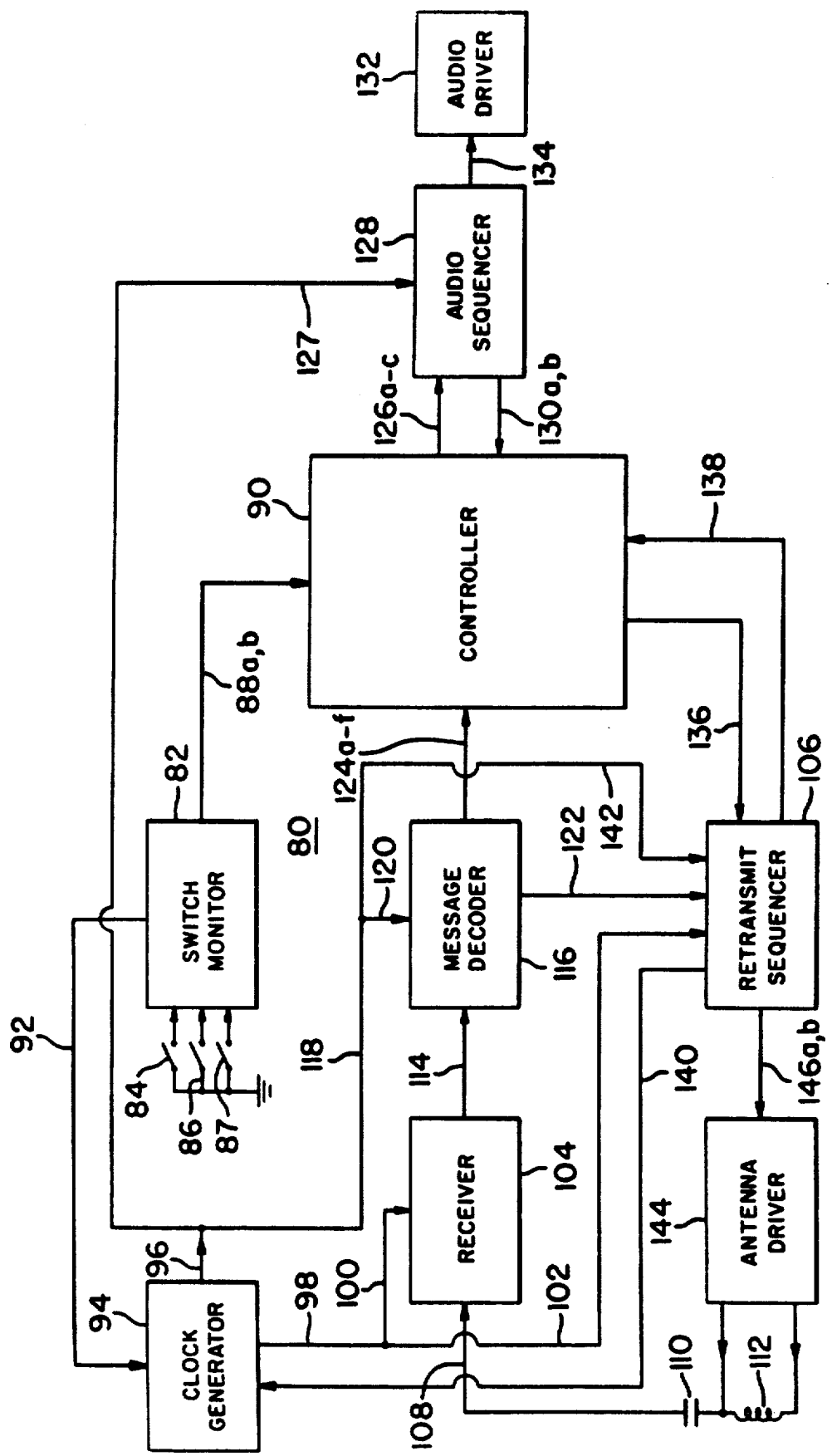
FIG. 4 is a block diagram of a preferred embodiment of a tag system for use in the FIG. 1 installation.

Tag system 80 of FIG. 4 includes switch monitor 82 which looks to the state of a tag attachment device, typically, an attachment pin, represented by switch 84, and to the state of a further switch 86, which changes state upon an attack on the tag, e.g., application of crushing force thereto. Upon change in state of either of switches 84 or 86, monitor indicates same on the corresponding one of lines 88a and 88b to controller 90. A further switch 87 may be included in the tag which is sensitive to motion of the tag and may also be looked at by monitor 82. Where the motion switch is off, tag battery life may be conserved by interrupting the supply of power to the tag.

Monitor 82 applies a signal to line 92 upon closure of switch 84, i.e., indicative of placement of the tag in active use, to clock pulse generator 94. Such start-up signal is for purposes of conservation of the battery which powers the tag system. On receipt thereof, generator 94 issues clock pulses on line 96 and furnishes wake-up indication over lines 98, 100 and 102 to receiver 104 and retransmit sequencer 106. Receiver 104

The output of receiver 104 is applied over line 114 to message sage decoder 116, which receives clock pulses over lines 118 and 120. The receiver also outputs indication of received and decoded interrogate messages over line 122 to retransmit sequencer 106. Output lines 124a through 124f extend from receiver 104 to controller 90 whereby the controller is apprised of received and decoded messages.

Controller 90 applies output control signals over lines 126a through 126c to audio sequencer 128, which receives clock pulses over line 127 and informs controller 90 of its activity over lines 130a and 130b. Audio driver 132, which includes a piezoelectric audio output component, is provided with drive signals over line 134 by audio sequencer 128.

Controller 90 furnishes control signals over line 136 to retransmit sequencer 106 and the latter informs controller 90 of its activities over line 138.

Sequencer 106 furnishes a stop signal over line 140 to clock pulse generator 94 and applies output signals governing tag retransmission to antenna driver 144 over lines 146a and 146b.

Figure 5:
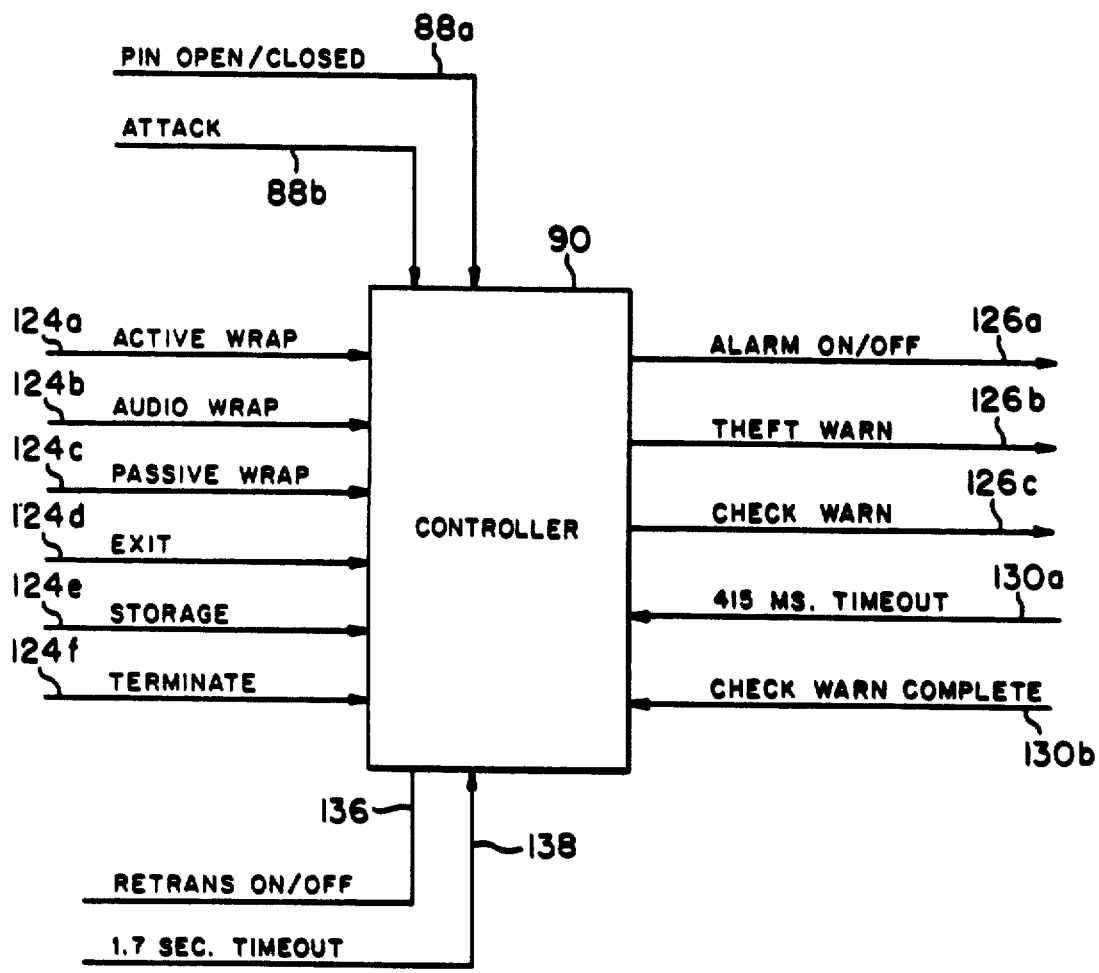
FIG. 5 is a separate showing of the controller of the FIG. 4 tag system with indication of its various input and output signals.

The input and output signals of controller 90 are collected in FIG. 5 with literal indication of the type of signal and its origin line from FIG. 4. The decoded messages, shown at the left input to controller 90 include Active Wrap, Audio Wrap, Passive Wrap, Exit, Storage and Terminate signals. At the top input to controller 90 are shown the Pin Open/Closed and Attack signals. At the top input to controller 90 are shown three different signals for audio output, namely, Alarm On/Off, Theft Warn and Check Warn signals. Below these signals are shown the replies of the audio output circuitry, 415 ms. Timeout and Check Warn Complete. Below controller 90 are shown its output to the retransmit sequencer, the Retrans On/Off signals, and the sequencer input to the controller, the 1.7 sec. Timeout signal.

Implementation of controller 90 will be discussed in connection with the flow charts of FIGS. 6 through 9, from which tag and system experience will also be seen.

Figure 6A:
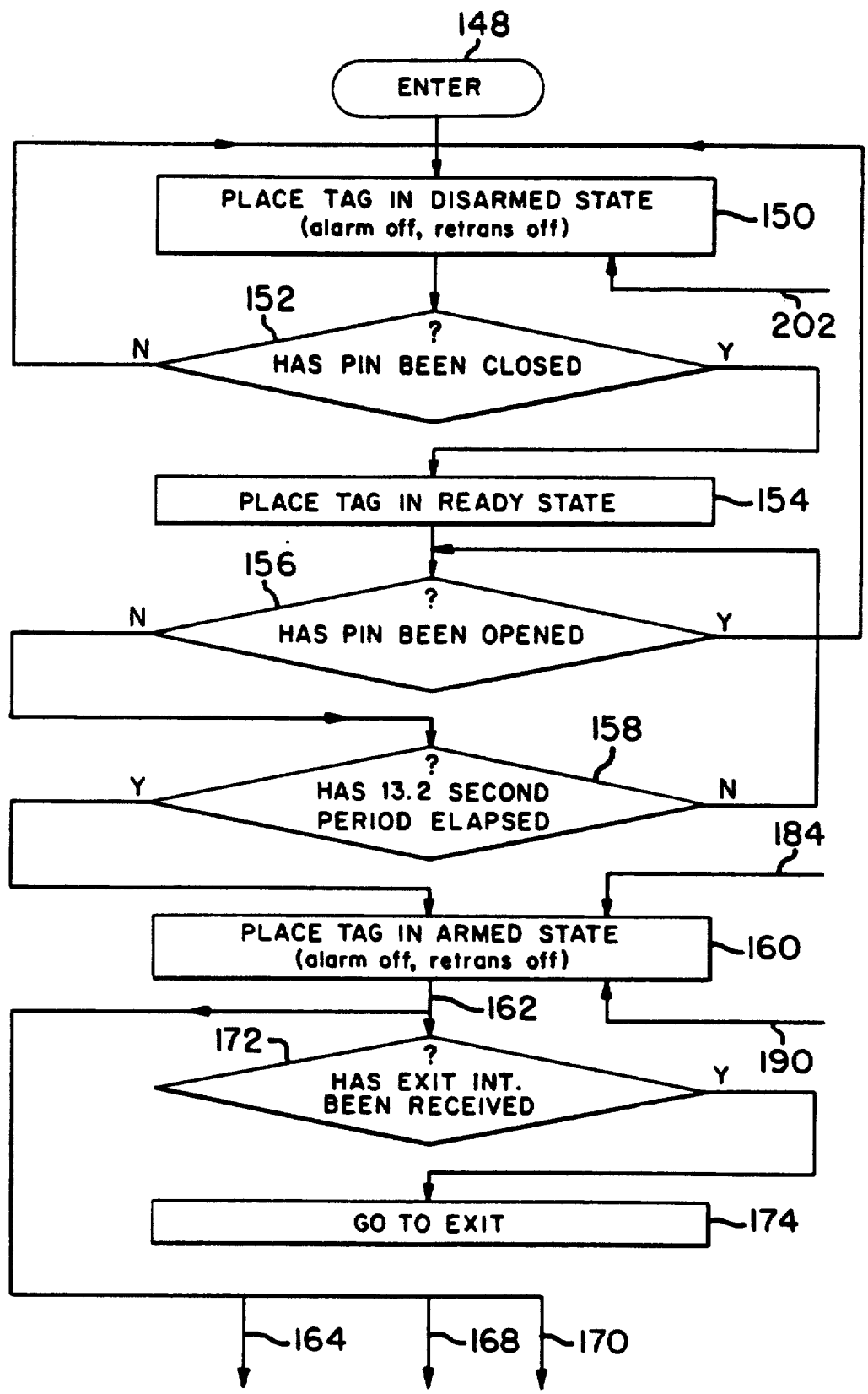
FIGS. 6(a) and 6(b) depict the flow chart of the main program implemented by the controller of FIG. 5.
Figure 6B:
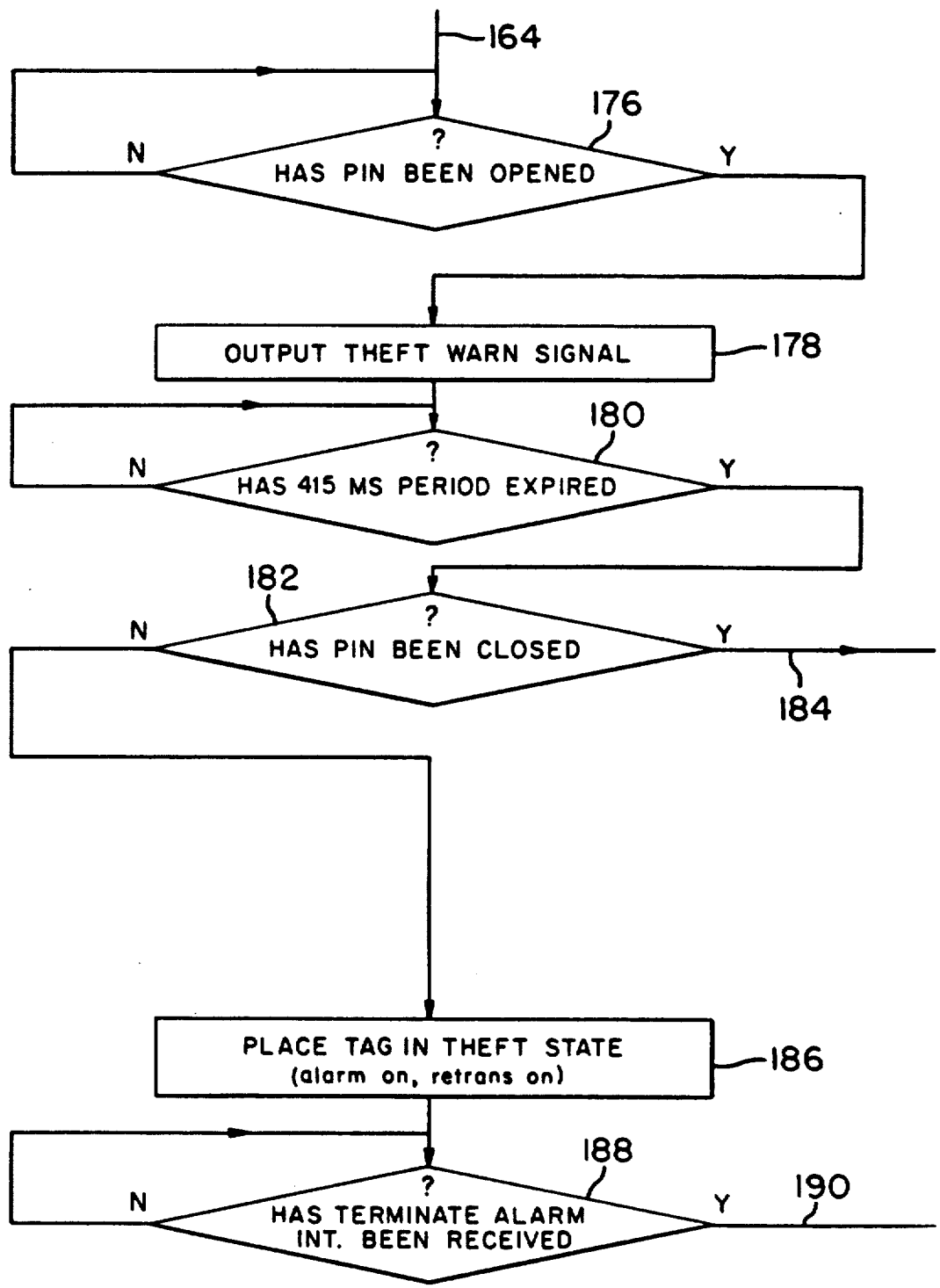

Turning to the main program, same is entered in step 148 (Enter) of FIG. 6(a) and starts with the tag in Disarmed state (step 150—Place Tag in Disarmed State). In this state, the tag alarm is off as is its retransmitter (retrans). Various measures will place the tag in Disarmed state, e.g., the Store message. The inquiry of step 152—? Has Pin Been Closed—is repeated on negative (N) answer and otherwise (yes—Y) leads to step 154—Place Tag in Ready State. The ready state is an interim or transient tag state, commencing with the inquiry of step 156 ? Has Pin Been Opened. A time period for this inquiry is set by step 158—? Has 13.2 Second Period Elapsed. If the pin is opened prior to the end of this period, return is made from step 156 to step 150. Otherwise, on expiration of the period, the program advances to step 160—Place Tag in Armed State.

In the Armed State, the tag alarm and retransmission are both off. Four paths of inquiry, as indicated by lines 162, 164, 168 and 170, are cycled through at this juncture, the first of which is set out in step 172—? Has Exit Int. Been Received. If the exit interrogation (message) is being received by the tag, the program advances through step 174—Goto Exit—to the exit subroutine of FIG. 8, below discussed.

In the second Armed State inquiry, step 176 is practiced—? Has Pin Been Opened. If the answer to this inquiry is affirmative, a warning is provided to the consumer in step 178—Output Theft Warn Signal. A short time period is measured in step 180—? Has 415 ms. Period Expired. Four tenths of a second are thus provided to permit the consumer to discontinue further efforts at opening of the pin to remove the tag from the article. If the consumer discontinues the opening course of action, an affirmative answer will result from the inquiry of step 182—? Has Pin Been Closed, and line 184 will return the program to Step 160 above.

Should the consumer continue in pin removal, advance is made to step 186—Place Tag in Theft State. Here, the tag alarm is turned on as is the tag retransmission. This condition will persist until security personnel take the measure of step 188—? Has Terminate Alarm Int. Been Received, at which time the program follows line 190 back to step 160 above.

The third path of inquiry is to step 196—? Has Wrap Int. Been Received. On positive answer to this inquiry, he program advances to its checkout subroutine of FIG. 7, below discussed, through step 198—Goto Checkout.

The fourth path of inquiry is to step 200—? Has Store Int. Been Received. On positive answer to this inquiry, he program returns via line 202 to step 150, whereby he tag is placed in Disarmed state.

Figure 7B:
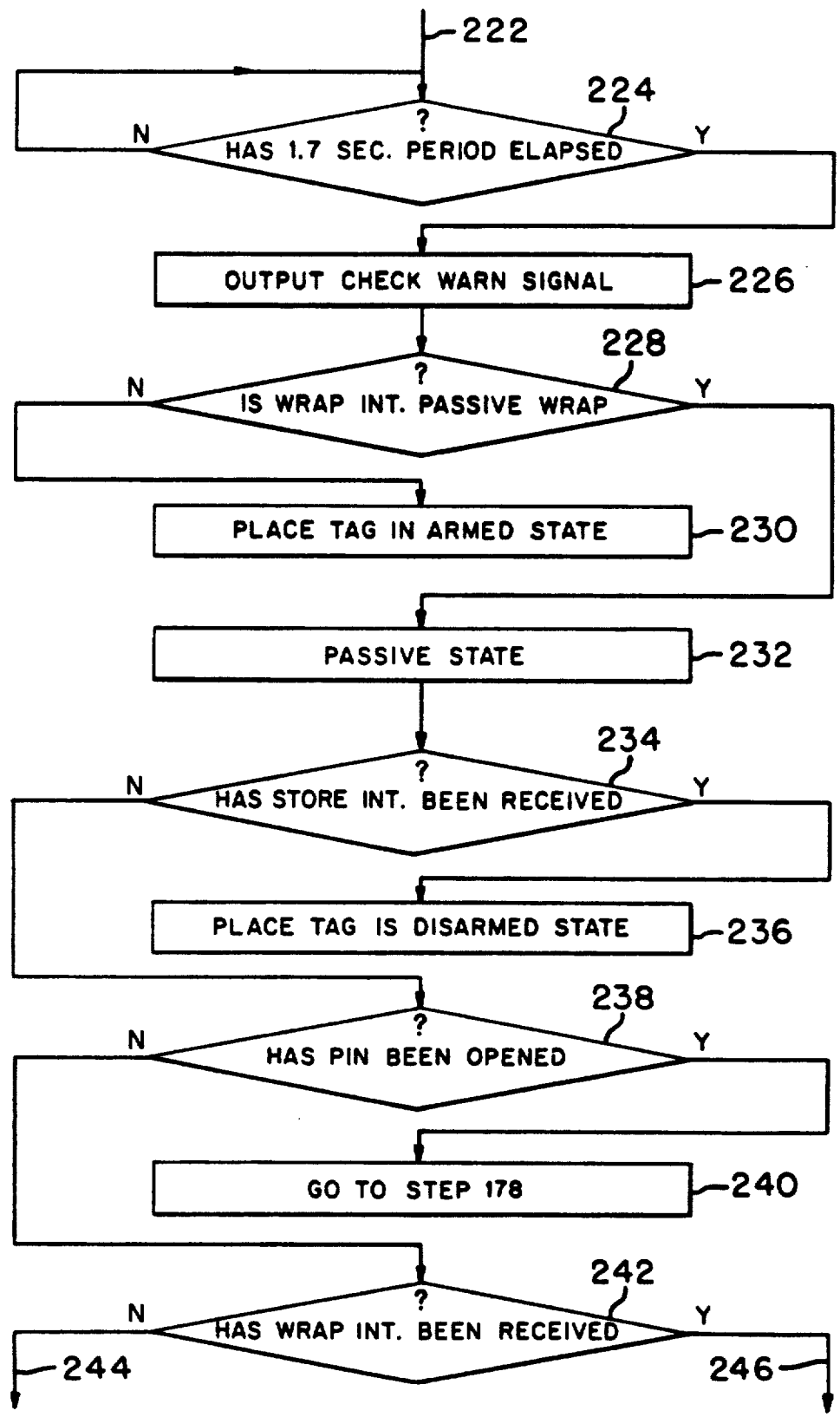
FIGS. 7(a), 7(b) and 7(c) depict the flow chart of the checkout subroutine of the main program implemented by the controller of FIG. 5.
Figure 7A:
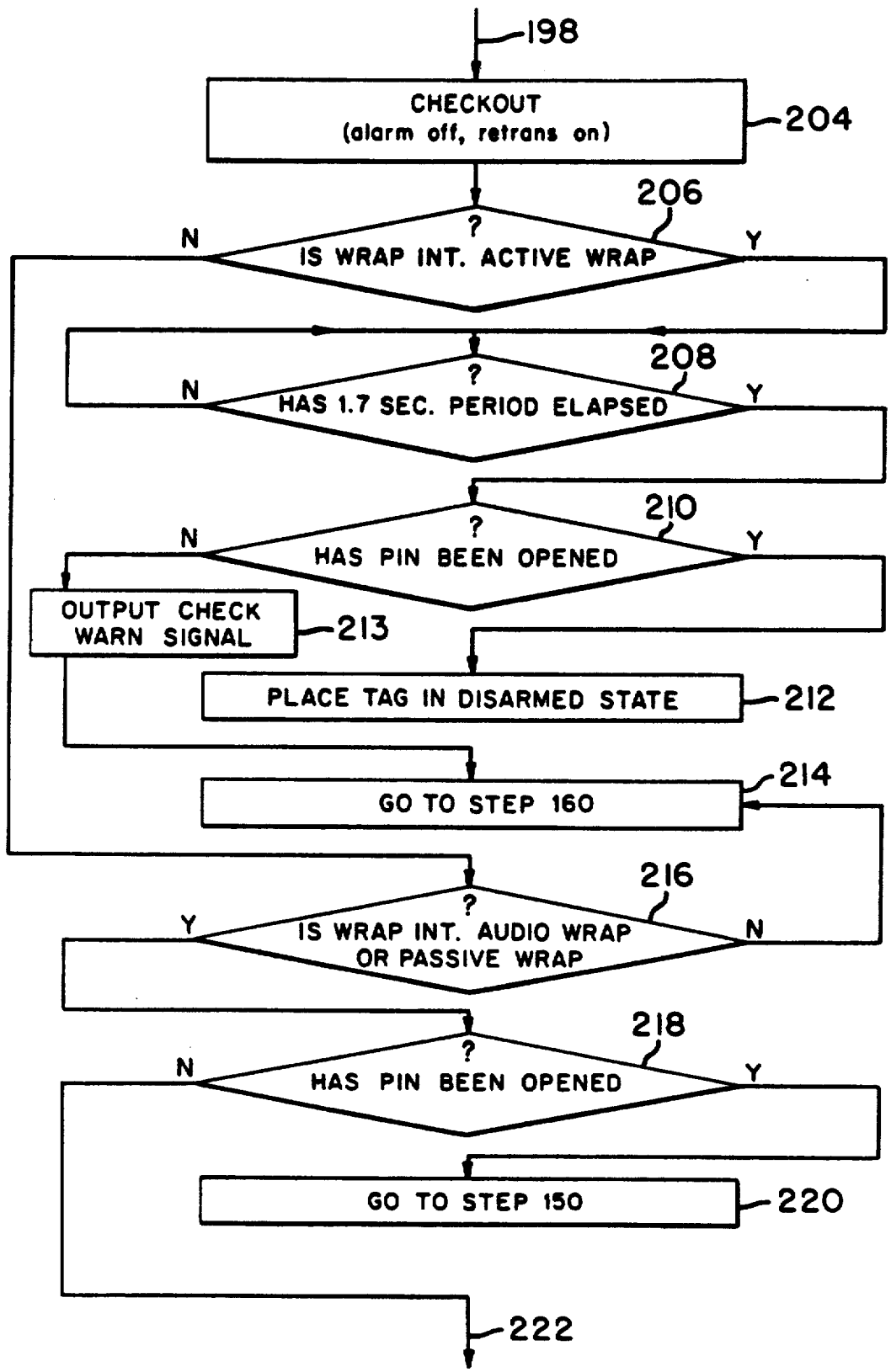
Figure 7C:
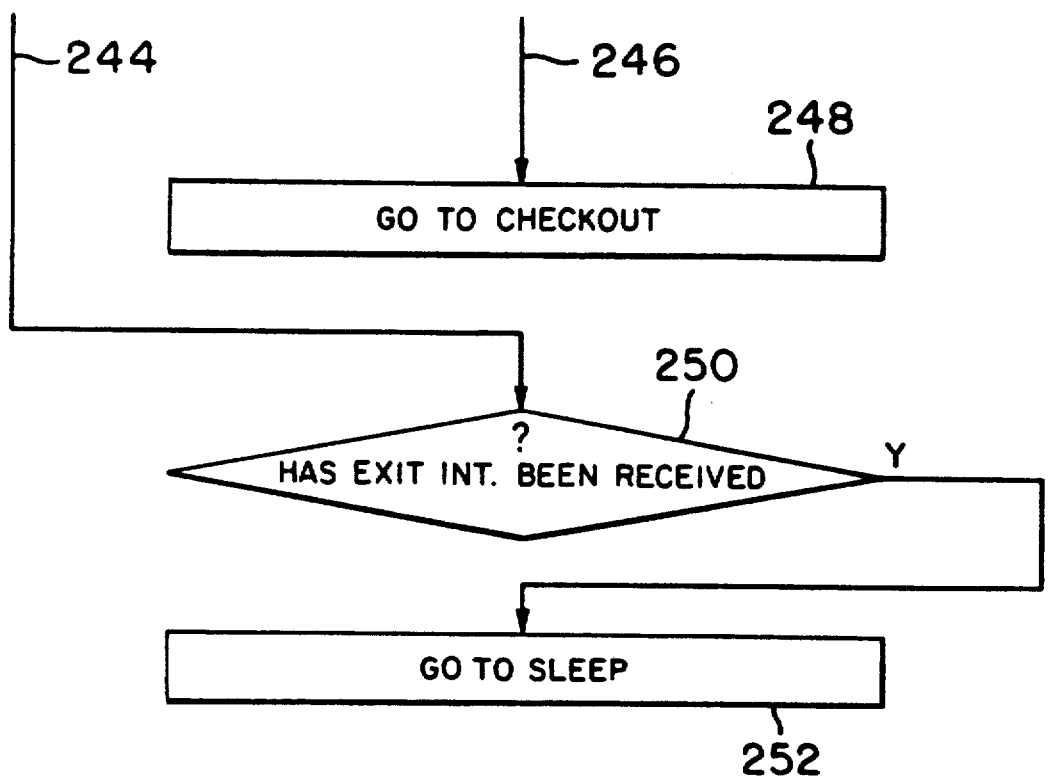

Turning now to the checkout subroutine, same is entered in FIG. 7(a) in step 204—Checkout, wherein the tag alarm is off and its retransmission is on. As noted above, the invention provides user selection as to three diverse checkout modes. Inquiry is made as to the first mode in step 206—? Is Wrap Int. Active Wrap. Assuming an affirmative reply to this inquiry, advance is to step 208—? Has 1.7 Sec. Period Elapsed. This provides a time window of almost two seconds during which a clerk at the checkout desk should open the pin and remove the tag from the article for storage thereof. If the clerk does so, positive reply exists then as to the inquiry of step 210—? Has Pin Been Opened, and advance is to step 212—Place Tag in Disarmed State.

If the inquiry of Step 210 is answered in the negative following the time period of 208, advance is through step 213, Output Check Warn Signal, to step 214—Goto Step 160, i.e., the tag is returned to Armed state. Upon subsequent receipt of an exit instruction, the tag will alarm and retransmit. Thus, this checkout mode adopts the premise that no tag will leave the retail installation.

If the answer to the step 206 inquiry was negative, i.e., that the checkout mode in use was not Active Wrap, practice advances to step 216—Is Wrap Int. Audio or Passive Wrap. If, for any reason, the answer to this inquiry is negative, the tag is directed to step 160 armed state in step 214. Otherwise, advance is to step 218—? Has Pin Been Opened. If the pin has been opened by the clerk, flow is to step 220—Goto Step 150 and the tag is placed in Disarmed state.

If the inquiry of step 218 is answered in the negative, advance is through line 222 into FIG. 7(b) and step 224—? Has 1.7 Sec. Period Elapsed. Upon expiration of this period, practice is made of step 226—Output Check Warn Signal.

Steps 216 through 226 are common to both Audio Wrap and Passive Wrap checkout modes. In step 228—? Is Wrap Int. Passive Wrap, inquiry is made to distinguish these checkout modes and subsequent handling of tags. A negative answer to step 228, indicating that the mode at hand is Audio Wrap, advances practice to step 230—Place Tag in Armed State. Accordingly, the above premise common to the Active Wrap mode is adopted also in the Audio Wrap mode, the Audio Wrap mode including also the Check Warn Signal.

If the inquiry of step 228 is answered in the affirmative, flow is to step 232—Passive State, retransmission on and alarm the inquiry of step 234—? Has Store Int. Been Received, positive reply to which advances practice to step 236—Place Tag in Disarmed State. On negative reply to the step 234 inquiry, flow is to step 238—Has Pin Been Opened, positive answer to which leads to step 240—Goto Step 178 and output of the theft warn signal. On negative answer to the step 238 inquiry, flow is to the inquiry of step 242—? Has Wrap Int. Been Received. Positive answer to the step 242 inquiry advances practice over line 246 to FIG. 7(c) and step 248—Goto Checkout. Negative answer to the inquiry of step 242 leads over line 244 to the inquiry of step 250—? Has Exit Int. Been Received. Affirmative reply to this inquiry leads to step 252—Goto Sleep.

Figure 8:
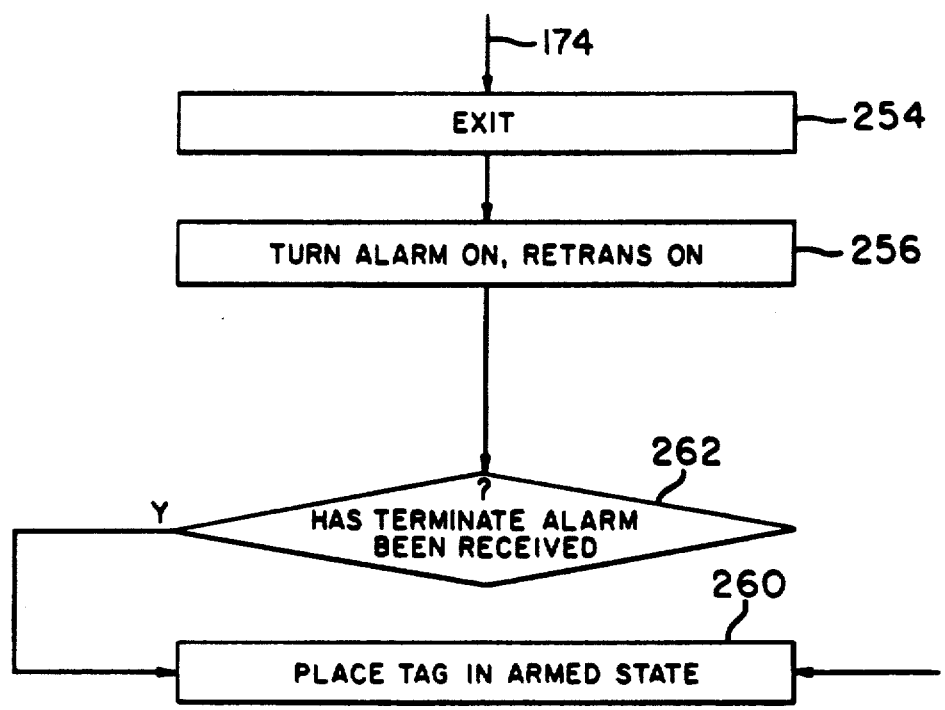
FIG. 8 depicts the flow chart of the fitting subroutine of the main program implemented by the controller of FIG. 5.

The exit subroutine of FIG. 8 is entered in step 254—Turn Alarm On, Retrans On. This tag condition continues until satisfaction of the inquiry of Step 262—? Has Terminate Alarm Int. Been Received. On positive response to this inquiry, flow is to step 260—Place Tag in Armed State.

Figure 9:
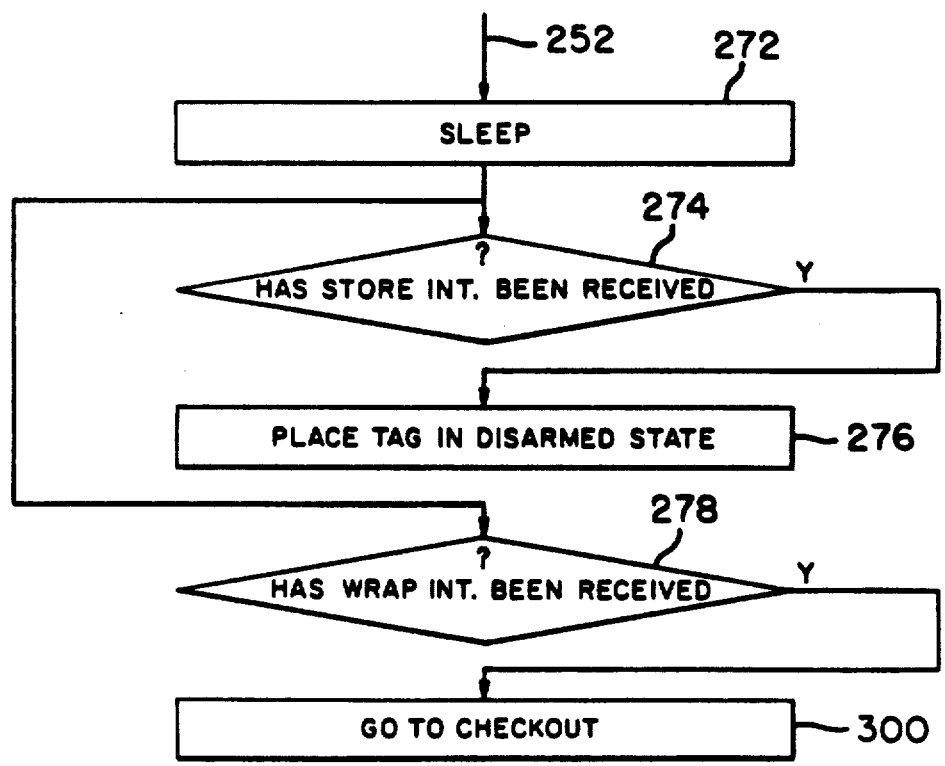
FIG. 9 depicts the flow chart of the sleep subroutine of the checkout subroutine of the main program implemented by the controller of FIG. 5.

Turning now to FIG. 9, the tag sleep subroutine, which flows from the checkout subroutine in the Passive Wrap checkout mode, is entered in step 272—Sleep. Inquiry is made in step 274—? Has Store Int. Been Received, and positive response thereto leads to step 276—Place Tag In Disarmed State. Inquiry is also made in step 278—? Has Wrap Int. Been Received, affirmative response to which leads to step 280—Goto Checkout.

FIG. 10(a) depicts a twelve slot time scale, T1 through T12, in which each of the twelve slots occupy 4.05 milliseconds, the total time scale being 4.86 milliseconds. In FIG. 10(b), there is shown the system signal transmission containing the message for Active Wrap checkout mode, comprising the digital format 101011001101. In each time slot of "1" designation, sixteen cycles of carrier are transmitted, for example, each cycle of 39.5 kilohertz, and in each time slot of "0" designation, carrier is not transmitted. Time slots T1 through T7 are dedicated to the preamble of transmitted signals, i.e., a pattern (1010110) which the receivers of tags must discern prior to considering the message of the transmitted signals. Time slots T8 through T12 comprise five slots in which the various messages or instruction words to be conveyed to tags are defined by permutative use of the time slots. The message pattern for the Active Wrap interrogation or signal is thus 01101 as in FIG. 10(b). The message pattern for the Audio Wrap signal is 01011 as in FIG. 10(c). The message pattern for the Passive Wrap signal is 10100 as in FIG. 10(d). The message pattern for the Exit signal is 01010 as in FIG. 10(e). The message pattern for the Storage signal is 10010 as in FIG. 10(f). The message pattern for the Terminate Alarm signal is 10011 as in FIG. 10(g). The message pattern for the Fitting signal is 10101 as in FIG. 10(h). FIG. 10(i) indicates the separation as between the preamble PR and the instruction word IW of system transmissions to tags.

Figure 11:
FIGS. 11, 12 and 13 depict diverse alarm driving signals for use in practice of the invention.
Figure 12:
Figure 13:

As noted above, the invention looks to a variety of audio output signals from its tags. FIG. 11 shows the output alarm indication selected for theft warning, a periodic audio drive signal which may have ON periods, indicated by positive pulses, each of 104 milliseconds, and OFF periods, occurring between successive ON periods, also of 104 milliseconds. Audio output occurs at, for example, 3291 hertz, during ON periods. The rightwardmost pulse in FIG. 11 is shown as foreshortened, as by reason of the occurrence of a Terminate Alarm signal.

FIG. 12(a) depicts a second variant of audio drive signal wherein two beeps will be provided to indicate the Theft Warn condition above discussed. The ON periods are indicated again by positive pulses, each of 104 milliseconds during which audio output at 3291 hertz occurs, and OFF periods are again indicated by the base line. FIG. 12(b) shows the Theft Warn complete signal, occurring at some 415 milliseconds after the two audio drive pulses.

In FIG. 13(a) is shown the -above-noted Check Warn audio drive signal, comprised of a periodic train of four ON periods indicated by positive pulses, each of 104 milliseconds during which audio output at 3291 hertz occurs, and OFF periods of 726 milliseconds between successive ON period pulses. FIG. 13(b) depicts the Check Warn Complete signal, which occurs on completion of the fourth ON period.

Figure 14:
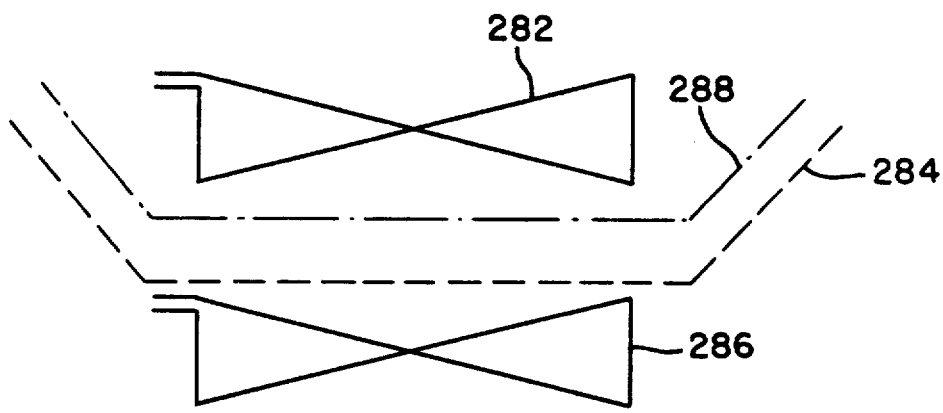
FIG. 14 shows an arrangement of primary and secondary transmitting antennas in accordance with the invention.
Figure 15:
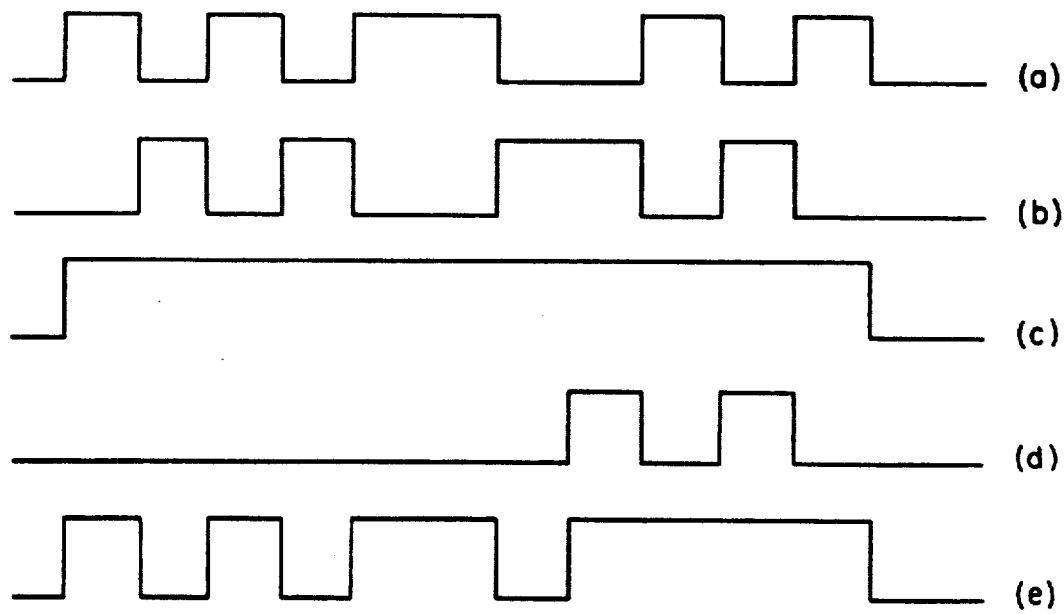
FIG. 15 illustrates various signal formats for the antenna arrangement of FIG. 14.

Prior to discussion of the antenna arrangement of FIG. 14, it will be helpful to reflect back on the outset introductory remarks with respect to the problems in prior art surveillance systems of type employing radiant energy transmissions to alarm tags. As therein noted, it is evidently desirable to define clear lines of demarcation as between intended article display and checkout transmissions thus have caused output alarm indication by tags disposed in the article display areas.

FIG. 14 depicts an antenna arrangement which might be disposed centrally in the exit area of the FIG. 1 installation, as contrasted with the sideward exit transmitter units 18a and 18b, and configured to avoid spurious transmission of the exit interrogation into the checkout area. Primary antenna 282 transmits the exit signal of FIG. 10(e), 101011001010, which is repeated in FIG. 15(a). The radiation pattern of antenna 282, which may be termed a primary antenna, is shown generally by the boundary line 284, extending into area adjacent the exit which desirably is for use in the checkout function. In accordance with the present invention, a secondary antenna 286 is introduced and is fed with the transmission signal of FIG. 15(b), whose digital format is 010100110101, the full complement of the FIG. 15(a) signal.

Given the respective complemental transmissions of primary and secondary antennas 282 and 286, a quite refined line of demarcation 288 is defined whereby articles displayed in the zone between line 288 and 284 are protected from spurious alarm indication. Thus, tagged articles in such zone will receive the signal shown in FIG. 15(c), which is bereft of both preamble and instruction word intelligence.

As is shown in FIG. 15(d), the transmission from secondary antenna 286 need not complement the preamble, but only the instruction word of the primary antenna transmission. Here, the secondary antenna transmission is quieted during the preamble portion of the primary antenna transmission and simply complements the instruction word transmission thereof. There results, as in FIG. 15(e), the receipt and decoding by tags of the preamble portion of the system transmission, but a meaningless (unused) instruction word (11111).

A further alternative in message transmission in accordance with the invention would employ transmitting antennas position opposite one another and transmitting into the space therebetween and behind the antennas. Each antenna transmits one half of the message and is quiet during the transmission of the other. Tags between the antennas receive the total transmitted message, whereas tags not located between the antennas will receive only one-half of the transmitted message and will accordingly be unresponsive.

As will be seen from the foregoing, the invention provides electronic surveillance system of type employing alarm tags releasably attachable to articles to be monitored in an installation and of type responsive to incident energy comprising EAS messages and other messages related to pricing and identification of articles and including circuitry for response to such EAS messages and for the receipt, storage and issuance of such pricing and article identification data.

A message generator is included for transmitting such EAS and other messages in the form of tag incident energy and for interrogating the tags both for EAS purpose and to cause such tag issuance of such stored pricing and identification data.

An inventory store may be responsive to such tag issuance of identification data for selectively decrementing stored inventory content corresponding to the identification data. A price totalizer maY be responsive to such tag issuance of the pricing data for totalization thereof.

The incident energy is inclusive of diverse such EAS tag messages and such other tag messages relating to the pricing and identification data and the tag may include common circuitry for processing in part all such incident energy messages.

Various changes to the particularly disclosed embodiments and modifications to the described practices may be introduced without departing from the invention. Thus, the preferred embodiments and methods are intended in an illustrative and not in a limiting sense. The true spirit and scope of the invention is set forth in the following claims.

We claim:

1. In combination, in an article retail facility:
   (a) an EAS (electronic article surveillance) tag of type including openable means for releasable attachment thereof to an article and responsive to incident energy comprising diverse EAS messages and other messages related to pricing and identification of articles, said tag including circuitry for response to such EAS message and for receipt and storage of such pricing and article identification data and for response to a selective one of said EAS messages and the opening of such releasable attachment means for issuance of said pricing and article identification data; and
   (b) message generator means for transmitting such EAS and other messages in the form of said incident energy.

2. The invention claimed in claim 1 further including inventory store means responsive to such tag issuance of said identification data for selectively decrementing stored inventory content corresponding to said identification data.

3. The invention claimed in claim 1 further including price totalizer means responsive to such tag issuance of said pricing data for totalization thereof.

4. The invention claimed in claim 1 further including inventory store means responsive to such tag issuance of said identification data for selectively decrementing stored inventory content corresponding to said identification data and price totalizer means responsive to such tag issuance of said pricing data for totalization thereof.

5. The invention claimed in claim 1 wherein said tag includes common circuit means for processing in part all such incident energy messages.

6. The invention claimed in claim 5 wherein said tag includes storage circuit means connected to said common circuit means for respective storage of said pricing and identification data.

7. The invention claimed in claim 1 wherein said tag includes circuitry responsive to the receipt of a selective one of such other tag messages to store said pricing and identification data.

8. The invention claimed in claim 1 wherein said tag includes means for display of said stored pricing information.

9. In combination, in an article retail facility for operator checkout of articles at a checkout location:

(a) an electronic article surveillance tag of type including first means responsive to checkout-initiated input thereto for generating a first output signal indicative of receipt of said tag of said checkout-initiated input, second means responsive to incident energy indicative of disposition of said tag at said checkout location to generate a second output signal indicative of receipt by said tag of said incident energy indicative of disposition of said tag at said checkout location, and third means for storage of pricing and article identification data and operably responsive to joint occurrence of said first and second signals for issuance of signals indicative of such stored data;

(b) message generator means for transmitting such incident energy indicative of disposition of said tag at said checkout location; and (c) means receiving said signals indicative of such stored data for effecting pricing of said articles and for controlling inventory thereof.

* * * * *

UNITED STATES PATENT AND TRADEMARK OFFICE
CERTIFICATE OF CORRECTION

PATENT NO. : 5,005,125
DATED : April 2, 1991
INVENTOR(S) : James G. Farrar, et al.

It is certified that error appears in the above-identified patent and that said Letters Patent is hereby corrected as shown below:

```
Col. 1, line 15, after "inventory" insert -- control --
   Col. 2, line 46, change "FIG. 1 is a" to -- FIG. 1 is an --
Col. 2, line 48, after "3" insert -- are -- and change
      "transmit" to -- transmitters --
Col. 4, line 7,  delete "to" first occurrence
Col. 4, line 23, change "t" to -- to --
Col. 4, line 30, change "Tag" to -- Tags --
Col. 5, line 25, change "sequested" to -- sequestered --
Col. 5, line 50, after "Receiver 104" insert -- is coupled by
      line 108 and capacitor 110 to tag antenna 112. --
Col. 6, line 34, after "156" insert -- - --
Col. 7, line 55, after "alarm" insert -- off. Continuation of
      the Passive Wrap checkout   mode leads to--
Col. 7, line 58, after "238-" insert -- - --
Col. 9, line 11, after "display", insert -- areas, exit  areas
      -- and after "checkout" insert -- stations.  On
      occasion, the exit and checkout--
```

UNITED STATES PATENT AND TRADEMARK OFFICE
CERTIFICATE OF CORRECTION

PATENT NO. : 5,005,125
DATED : April 2, 1991
INVENTOR(S) : James G. Farrar, et al It is certified that error appears in the above-identified patent and that said Letters Patent is hereby corrected as shown below:

Col. 10, line 7, change "maY" to -- may --
Col. 10, line 10, change "diverse such" to -- such diverse --
Col. 11, line 4, change "of" second occurrence to -- by --

Signed and Sealed this

Thirteenth Day of October, 1992

Attest:

DOUGLAS B. COMER

Attesting Officer     Acting Commissioner of Patents and Trademarks